April 25, 1939.   A. E. PRICE   2,155,562

DIFFERENTIAL PINION GAUGE

Filed Sept. 26, 1938

INVENTOR.
ARTHUR E. PRICE
BY Parker & Burton
ATTORNEYS.

Patented Apr. 25, 1939

2,155,562

UNITED STATES PATENT OFFICE 2,155,562

DIFFERENTIAL PINION GAUGE

Arthur E. Price, Jackson, Mich., assignor to Hinckley-Myers Company, Jackson, Mich., a corporation of Michigan Application September 26, 1938, Serial No. 231,683

4 Claims. (Cl. 33—181)

This invention relates to an improved pinion setting gauge for rear axle drive mechanism of automobiles or trucks.

An object is to provide a simple, inexpensive, accurate measuring device whereby the pinion setting of rear axle drive mechanism for any conventional truck or automobile rear axle may be quickly and accurately determined. A further object is the provision of a device of the character described which is adaptable for use to determine the pinion setting in rear axle drive mechanisms which vary in size.

In the assembly during repair and replacement or the like of rear axle drive mechanisms the drive pinion must be positioned securely with respect to the ring gear. The proper setting point is determined by the manufacturer for each size and make within limited permissible variation. This setting is known.

An object of this invention is to provide a device which is usable with any conventional type of rear axle mechanism and with any size of unit to determine the setting of the drive pinion in order that it may be properly set to accurately mate with the ring gear. The device is operable to indicate the variation of the pinion from the proper setting if such variation is present. The device is particularly adapted to function with either small or large diameter casings within which drive pinions are positioned and is readily extensible or contractible for this purpose. This invention constitutes an improvement upon the structure shown in my Patent No. 2,117,854.

Other objects, advantages, and meritorious features of my invention will more fully appear from the following description, appended claims, and accompanying drawing, wherein:

In the setting of the drive pinion it is necessary that it mate accurately with the ring gear and to determine its proper setting the ring gear mechanism is removed from the housing or casing exposing the end of the pinion. As this tool is a universal tool adapted for use with many different kinds of vehicles including trucks and automobiles of different makes it is desirable that it be adaptable to fit in casings which differ in size and to support the gauge mechanism properly to register the required distance between the axis of the bearings that support the seating discs of the tool and the end face of the pinion contacted by the stem of the micrometer. The structure here disclosed is an improvement upon the structure disclosed in my Patent No. 2,117,854, dated May 17, 1938.

Figure 2:
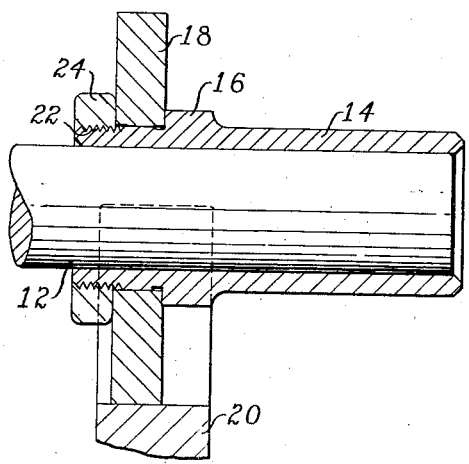
Fig. 2 is a fragmentary elevation of one spindle portion and partly in section.

The instant construction comprises a device having a body member which is provided with a central portion 10 that carries and supports gauge mechanism hereinafter described and oppositely directed axially aligned spindle portions 12. Each spindle portion is shaped to a true circumference and has mounted thereupon a sleeve element 14. The sleeve element is of substantial length as shown in the figures and is provided with a shoulder or stop portion 16. This shoulder is adjacent to one end of the sleeve and may be formed integrally therewith as shown in Fig. 2 or it might be a stop fixed to the sleeve in another manner if such construction was desired. The end of the sleeve adjacent to the shoulder has a true diameter face portion which is adapted to support a seating disc or other seating member having an arcuate peripheral portion. The seating disc is herein indicated as 18.

Figure 1:
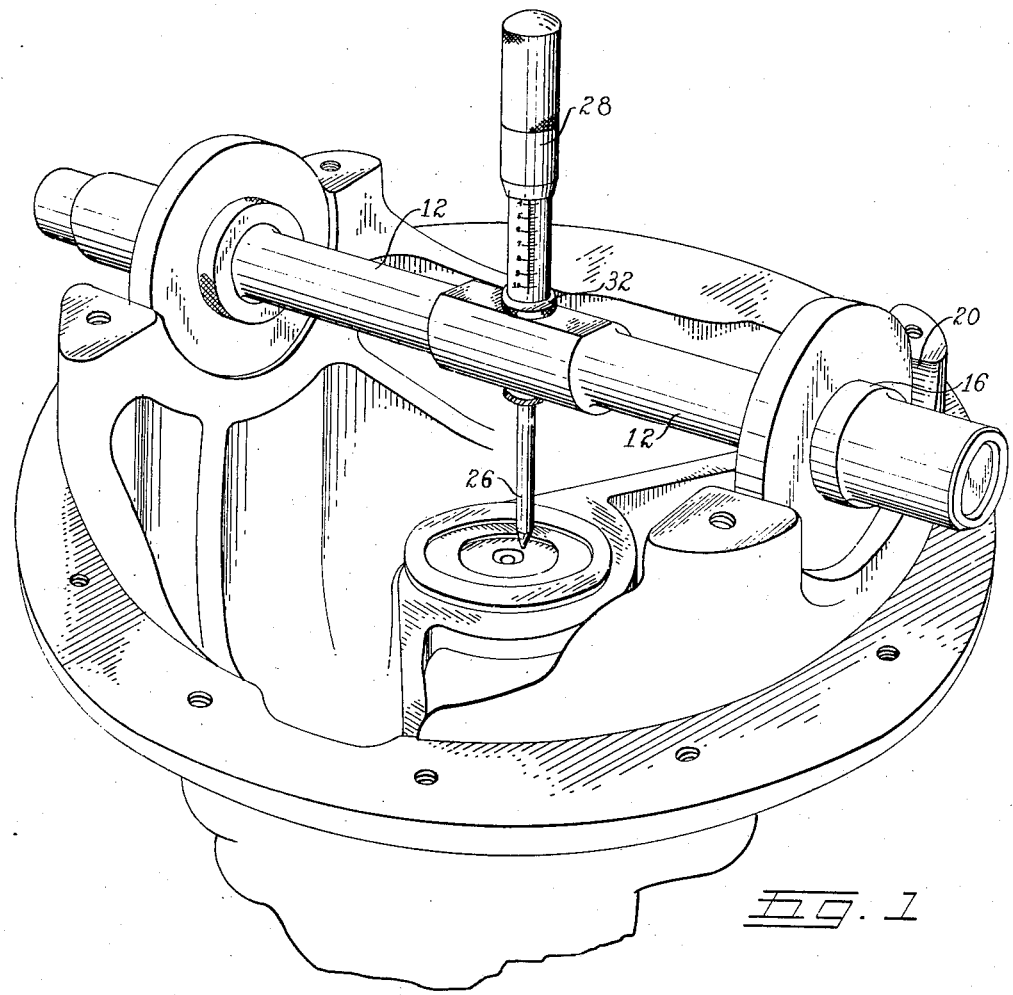
Figure 1 is a perspective of my invention showing the same in position for use.

The seating disc is of a size as shown in Fig. 1 to snugly fit within the bearing portion 20 of the casing or housing in order that it may be adaptable for use with many different types of casings. A plurality of pairs of these seating discs of different diameter are provided for each tool. To hold a disc in place the end of the sleeve adjacent to the shoulder 16 is threaded as at 22 and an internally threaded lock ring 24 is receivable thereupon to hold the disc snugly against the shoulder. The lock ring may be externally knurled for ready manipulation as shown at the left hand of Fig. 1.

The gauge mechanism carried by the central portion 10 of the body may be of any suitable character. A micrometer of conventional construction is here shown. It has a pointer element 26 actuated by a manually rotatable handle portion 28 and indicating figures 30 are shown. This gauge mechanism may be secured in place within the body 10 by adjustable threaded lock rings 32 or in any other suitable manner. Rotation of the handle will project or withdraw the pointer 26 and the extent of its projection or withdrawal is minutely measured on the gauge.

In the use of the device it will be positioned as shown in Fig. 1 with discs of a proper diameter to seat snugly within the semi-circular bearings 29 of the housing and with the pointer disposed to be projected against the end face of the drive pinion to measure the required seating thereof.

A compilation of known data is provided which will show the seating for the drive pinion of any make and model of truck or passenger vehicle and from this data it can be ascertained if the seating is correct or incorrect. If it is incorrect the extent of its variation will be measured. Due to the fact that differential housings vary substantially in diameter the slidability of the sleeve 14 upon the spindle 12 permits the disc to be moved in or out to properly position it within the semi-circular bearings.

Furthermore, it will be seen that the dimension may be substantially varied by reversing the sleeve on the spindle. With the sleeve disposed as shown in Fig. 1 it is apparent that the mechanism might be used with casings of the smallest diameter. If the sleeve is reversed the disc will be disposed beyond the end of the spindle and the device could be used with casings of large diameter. It is not possible to provide a spindle of substantial length because in measuring of the setting of the drive pinion there are other interferring structural casing parts not shown which would interfere with the employment of a long spindle in a small diameter casing structure. The embodiment of the slidable sleeve with the seat on one end for use with any one of a plurality of discs and which sleeve is itself reversible upon its supporting spindle permits the mechanism to be used with substantially all conventional commercial constructions.

What I claim is:

1. A pinion setting gauge comprising in combination a spindle, gauge mechanism supported by said spindle intermediate the ends thereof, said gauge mechanism including indicatng means and a part adjustably movable in a direction normal to the axis of the spindle, sleeves of substantial length compared to that of half the length of the spindle mounted on said spindle on each side of the gauge mechanism and capable if end-for-end reversible mounting thereon, a supporting seat having an arcuate peripheral portion slidably mounted on each sleeve adjacent an end thereof, and means for positively positioning said seats upon said sleeves in definite axial relation thereto.

2. A pinion setting gauge comprising, in combination, a spindle, gauge mechanism supported by said spindle intermediate the ends thereof, said gauge mechanism including indicating means and a part adjustably movable in a direction normal to the axis of the spindle, sleeves of substantial length compared to that of half the length of the spindle mounted on said spindle on each side of the gauge mechanism and capable of end-for-end reversible mounting thereon, a stop on each sleeve intermediate the ends of the sleeve, each sleeve having a smooth external true diameter face portion adjacent to one axial face of its stop, a supporting seat for each sleeve receivable axially over one end of the sleeve and snugly receivable upon said true diameter face portion into abutment with the stop, each seat being provided with an arcuate peripheral seating portion, and means on the sleeve holding said seat against the stop.

3. A pinion setting gauge comprising, in combination, a spindle, gauge mechanism supported by said spindle intermediate the ends thereof, said gauge mechanism including indicating means and a part adjustably movable in a direction normal to the axis of the spindle, sleeves of substantial length compared to that of half the length of the spindle mounted on said spindle on each side of the gauge mechanism and capable of end-for-end reversible mounting thereon, a stop on each sleeve intermediate the ends of the sleeve, each sleeve having a smooth external true diameter face portion adjacent to one axial face of its stop, a supporting seat for each sleeve receivable axially over one end of the sleeve and snugly receivable upon said true diameter face portion into abutment with the stop, each sleeve being threaded at one end adjacent to its true diameter face portion and spaced from its stop, and a part engaging the threaded portion of each sleeve adapted to hold the supporting seat against the stop.

4. A pinion setting gauge comprising, in combination, a spindle, gauge mechanism supported by said spindle intermediate the ends thereof, said gauge mechanism including indicating means and a part adjustably movable in a direction normal to the axis of the spindle, sleeves of substantial length compared to that of half the length of the spindle mounted on said spindle on each side of the gauge mechanism, a pair of complementary supporting seats adapted to support the spindle, each seat being mounted on one of the sleeves and having an arcuate peripheral portion, each sleeve being axially slidable over its end of the spindle to a plurality of axial positions thereon and being end-for-end reversible thereon to position its supporting seat spaced inwardly from the end of the spindle or spaced outwardly beyond the end of the spindle.

ARTHUR E. PRICE.